United States Patent
Yoshida (10) Patent No.: US 7,289,262 B2
(45) Date of Patent: Oct. 30, 2007

(54) OPTICAL ATTENUATOR ELEMENT, AND VARIABLE OPTICAL EQUALIZER AND OPTICAL AMPLIFIER THAT USE THIS OPTICAL ATTENUATOR ELEMENT

(75) Inventor: Satoshi Yoshida, Tama (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 135 days.

(21) Appl. No.: 11/062,165

(22) Filed: Feb. 18, 2005

(65) Prior Publication Data

US 2005/0206999 A1 Sep. 22, 2005

(30) Foreign Application Priority Data

Mar. 19, 2004 (JP) ............................. 2004-080128

(51) Int. Cl.
*H01S 3/00* (2006.01)
(52) U.S. Cl. .................................... 359/337.1; 359/578
(58) Field of Classification Search ................ 359/337, 359/337.1, 578
See application file for complete search history.

(56) References Cited

U.S. PATENT DOCUMENTS

| 6,285,504 B1 * | 9/2001 | Diemeer ...................... 359/578 |
| 6,590,710 B2 * | 7/2003 | Hara et al. ................... 359/579 |

FOREIGN PATENT DOCUMENTS

| CN | 1423161 | 6/2003 |
| JP | 2000-199880 | 7/2000 |

* cited by examiner

*Primary Examiner*—Mark Hellner
(74) *Attorney, Agent, or Firm*—David N. Lathrop, Esq.; Gallagher & Lathrop (57) ABSTRACT

Instead of using a demultiplexer to divide an optical signal into different wavelengths, this invention uses a plurality of cascade-connected optical attenuator elements whose attenuation factor and the wavelength characteristics thereof can both be varied. Reflective optical attenuator elements are used instead of the conventional transmissive elements, and these are column connected by connecting them in sequence to an optical circulator. In these reflective optical attenuator elements, the attenuation factor is controlled by displacing the mirror of a Fabry-Perot optical resonator along a direction perpendicular to the optical axis so that the reflecting surface moves away from the light spot, and the wavelength characteristics of the attenuation factor are controlled by displacing the mirror in the direction of the optical axis to change the resonant wavelength. In this way, it is possible to implement a variable-gain optical equalizer with a simple configuration and low insertion loss. Furthermore, since the reflective elements are configured so that the light-transmitting part (e.g., optical fiber) is only connected in one direction with respect to these elements, there are fewer physical constraints when attaching the movable plate of a device with a minute range of movement compared with a configuration where light-transmitting parts are connected in at least two directions of the element as is the case with transmissive elements.

12 Claims, 8 Drawing Sheets

PRIOR ART

FIG. 11

OPTICAL ATTENUATOR ELEMENT, AND VARIABLE OPTICAL EQUALIZER AND OPTICAL AMPLIFIER THAT USE THIS OPTICAL ATTENUATOR ELEMENT

BACKGROUND OF THE INVENTION

This invention relates to a variable-gain optical equalizer that equalizes the light intensity of optical signals at different wavelengths, and to optical gain equalizer equipment that uses this equalizer.

Wavelength division multiplexing (WDM) optical transmission is a key technology for increasing the capacity of optical communication equipment. In this transmission scheme, a plurality of optical signals at different wavelengths are multiplexed together and transmitted in a single optical transmission line. Also, technologies that have been developed and put into practical use for optical amplifiers include optical semiconductor amplifiers that use optical semiconductors, and optical fiber amplifiers in which the amplification medium consists of an optical fiber doped with a rare earth material such as erbium. Since these optical amplifiers are able to simultaneously amplify optical signals over a range of wavelengths where a positive gain can be obtained, they can be applied to WDM optical transmission equipment to implement high-capacity long-distance transmission equipment.

However, the optical gain characteristics of an optical amplifier are dependent on wavelength. This wavelength-dependence gives rise to non-uniformity in the light intensity of each optical signal (referred to as "wavelength imbalance" in the following). A concerted effort at reducing this wavelength imbalance will lead not only to a broader range of wavelengths over which optical signals can be transmitted, but also to increased transmission capacity. One might therefore say that devices that reduce wavelength imbalance are indispensable in optical communications.

Hitherto, the wavelength imbalance has been reduced by inserting an optical equalization filter into the optical fiber transmission path. However, in cases where the wavelength dependence of the optical amplifier changes due to changes in the optical signal strength or optical amplifier gain, an optical equalization filter is unable to track these changes dynamically.

Figure 11:
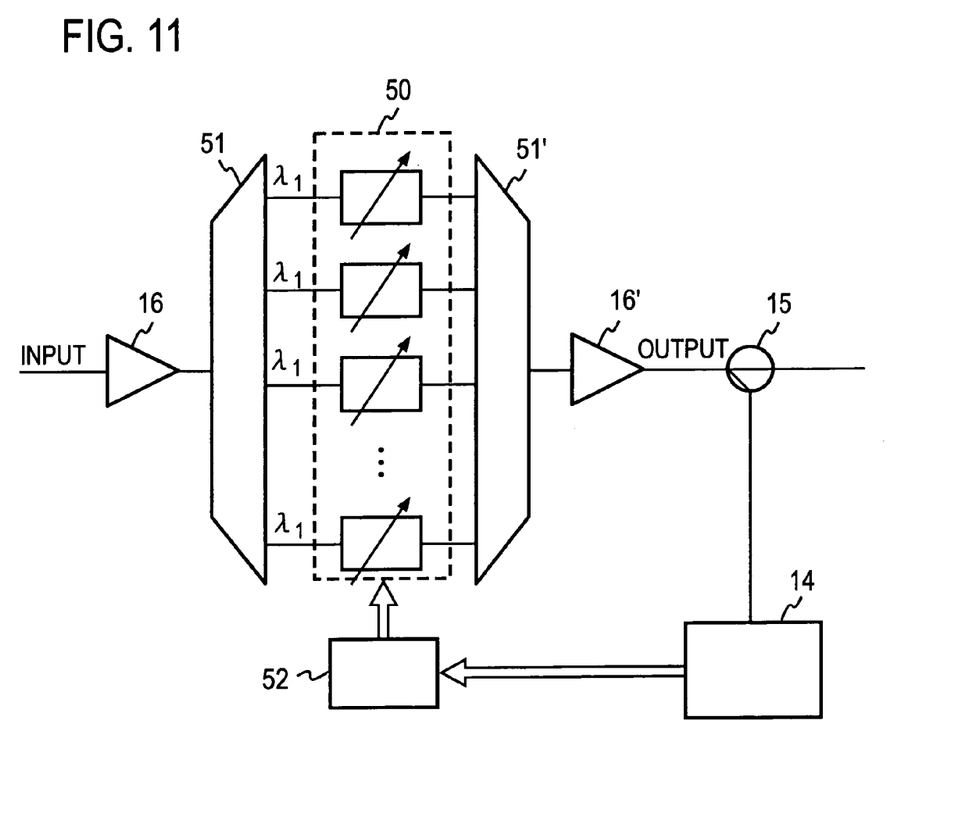
FIG. 11 shows a functional embodiment of optical amplification equipment including a conventional variable gain equalizer.

To deal with this problem, the use of variable-gain optical equalizers has been investigated. FIG. 11 shows a conventional example of a variable-gain optical equalizer. In this variable-gain optical equalizer, the incident light is split by a demultiplexer 51 into light at individual wavelengths $\lambda_1$ through $\lambda_n$, and the light at each wavelength is individually attenuated by a variable optical attenuator 50 and then recombined by a multiplexer 51'. In this figure, 15 is an optical coupler that is wavelength-independent at least over the wavelength region of the optical signal, 16 and 16' are optical amplifiers, 14 is a spectrum monitor, and 52 is a circuit that drives variable optical attenuator 50.

Japanese Patent Application Kokai Publication No. 2000-199880 discloses a technique whereby a plurality of filter modules are connected in series and the wavelength characteristics of each filter module are controlled in order to maintain constantly flat wavelength characteristics by tracking changes in the wavelength characteristics. (This publication is referred to as "Reference 1" below.)

A general description of the abovementioned variable-gain optical equalizers is presented below, along with a description of their problems.

Variable-gain optical equalizers can be broadly classified into the following types:

(1) variable-gain optical equalizers in which the optical signal is split into different wavelengths by a demultiplexer, each wavelength is processed in parallel by an optical attenuator element whose light intensity attenuation factor can be varied for this wavelength, and then the wavelengths are recombined by a multiplexer, and (2) variable-gain optical equalizers that do not use a demultiplexer but comprise a plurality of cascade-connected attenuation elements whose attenuation factors and the wavelength characteristics thereof can both be varied.

The configuration illustrated in FIG. 11 is a typical example of a variable-gain optical equalizer of type (1). This type can also be implemented with a single demultiplexer/multiplexer by using an optical circulator and reflective optical attenuator elements. Either way, since this type requires variable optical attenuators equal in number to the number of wavelength channels, it is not possible to avoid the increased costs associated with the elevated number of components. Another problem is that large insertion losses are incurred because the optical signals are subjected to a multiplexing process after they have been split apart. Furthermore, to ensure that the wavelength gain equalization is controlled stably, each optical attenuator element must be controlled by monitoring the light intensity in each wavelength channel, resulting in problems due to the increased complexity of the control system as the degree of multiplexing increases.

A fundamental technique for a variable-gain optical equalizer of type (2) is a technique for flattening the wavelength characteristics of the optical gain by employing a plurality of cascade-connected optical attenuator elements. However, these optical attenuator elements have consisted of elements such as transmissive Fabry-Perot resonators in which the attenuation factor and wavelength characteristics thereof are fixed. Reference 1 proposes a technique that makes it possible to adapt these to fluctuations in the optical amplifier gain characteristics and the spectrum of the input light.

And methods that might be used to modify the attenuation factor wavelength characteristics with a plurality of optical attenuator elements include using optical attenuator elements corresponding to the Fourier series components of the attenuation factor wavelengths, or a non-linear fitting application technique. Also, instead of Fabry-Perot resonators, the optical attenuator elements might be Mach-Zehnder filters or gratings or the like.

But regardless of whether Fourier expansion or non-linear fitting is used, in order to construct a gain equalizer as a variable device that can adapt to fluctuations of the input light, the two factors of attenuation factor and the wavelength characteristics at which the cascade connected optical attenuator element operates must be subjected to variable control, and specific devices that have hitherto been proposed to achieve this have therefore employed an active configuration where a Mach-Zehnder filter, Fabry-Perot resonator or grating is combined with an optical amplification medium, and all of these examples are configured with a variable amplification element according to Reference 1. However, no specific mention can be found relating to the method for controlling the wavelength characteristics of the attenuation factor of the optical attenuator elements, or the method for controlling the gain characteristics and phase characteristics independently. Also, the elements in these configurations are all transmissive.

SUMMARY OF THE INVENTION

Instead of using a demultiplexer to divide an optical signal into different wavelengths, this invention uses a plurality of cascade-connected optical attenuator elements whose attenuation factor and the wavelength characteristics thereof can both be varied. Also, reflective optical attenuator elements are used instead of the conventional transmissive elements, and these are column connected by connecting them in sequence to an optical circulator. In these reflective optical attenuator elements, the attenuation factor is controlled by displacing the mirror of a Fabry-Perot optical resonator along a direction perpendicular to the optical axis so that the reflecting surface moves away from the light spot, and the wavelength characteristics of the attenuation factor are controlled by displacing the mirror in the direction of the optical axis to change the resonant wavelength. In this way, it is possible to implement a variable-gain optical equalizer with a simple configuration and low insertion loss.

Furthermore, since the reflective elements are configured so that the light-transmitting part (e.g., optical fiber) is only connected in one direction with respect to these elements, there are fewer physical constraints when attaching the movable plate of a device with a minute range of movement compared with a configuration where light-transmitting parts are connected in at least two directions of the element as is the case with transmissive elements. Accordingly, the optical attenuator element could easily be a MEMS (micro-electro-mechanical systems) device made using micro-machining techniques, which not only allows the size to be reduced and the integration density to be increased, but also allows the productivity to be improved.

DESCRIPTION OF THE PREFERRED EMBODIMENT

The best mode for implementing the invention is thought to be as described below.

Figure 1A:
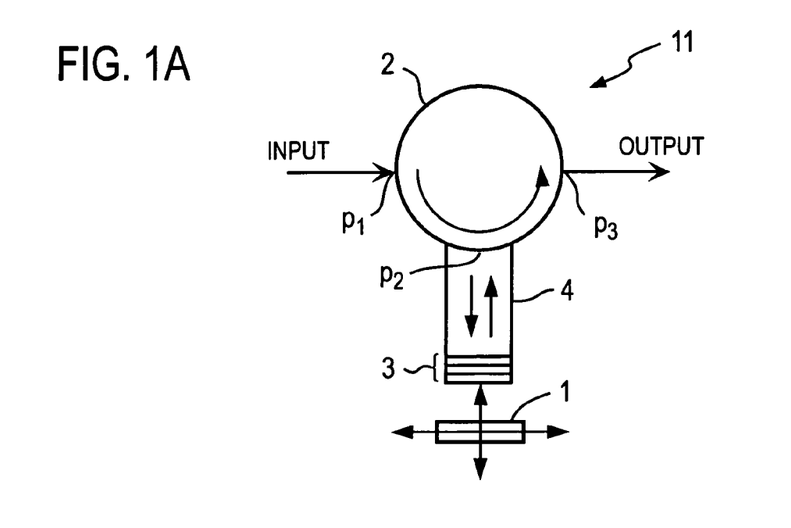
FIG. 1A shows a schematic illustration of the configuration of a reflective optical attenuator element.

FIG. 1A shows the configuration of an optical attenuator element 11 that is an important constituent element of a variable-gain optical equalizer 10. Optical attenuator element 11 consists of an optical circulator 2 with three optical input/output ports $p_1$, $p_2$ and $p_3$, an optical fiber 4 which is linked to the second optical input/output port $p_2$ of optical circulator 2, a reflective layer 3 comprising a dielectric multi-layer film formed on the 0° polished end facet of optical fiber 4, and a mirror device 1 which faces towards and is oriented parallel with reflective layer 3 with the intervening gap filled with a medium consisting of air. This mirror device 1 has a movable mechanism that performs translational movements in the direction of the optical axis and a direction perpendicular to the optical axis.

Figure 1B:
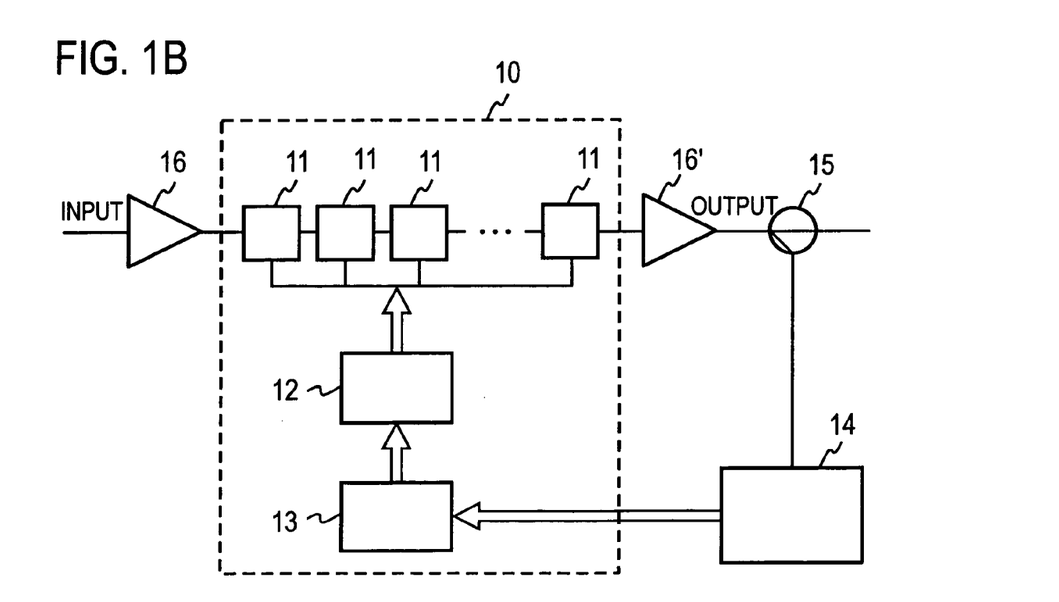
FIG. 1B shows an example of the functional configuration of optical amplification equipment including a variable-gain optical amplifier.

The parts enclosed by the dashed line in FIG. 1B indicate the parts that correspond to variable-gain optical equalizer 10 of this invention. This variable-gain optical equalizer 10 comprises an array of optical attenuator elements formed by the cascade connection of a plurality of optical attenuator elements 11 shown in FIG. 1A, and a processing unit consisting of a CPU 13 and an optical attenuator element drive circuit 12 that controls this array.

The action of variable-gain equalizer 10 is described first. In the optical attenuator element 11 shown in FIG. 1A, an optical signal consisting of wavelength-multiplexed light is input from first port $p_1$ of optical circulator 2 and guided to optical fiber 4 via second port $p_2$ of optical circulator 2. The optical signal guided through optical fiber 4 is reflected by reflective layer 3 formed on the 0° polished end facet of optical fiber 4, travels back via optical fiber 4 and second part $p_2$ of optical circulator 2, and is emitted from third port $p_3$ of optical circulator 2.

Figure 2:
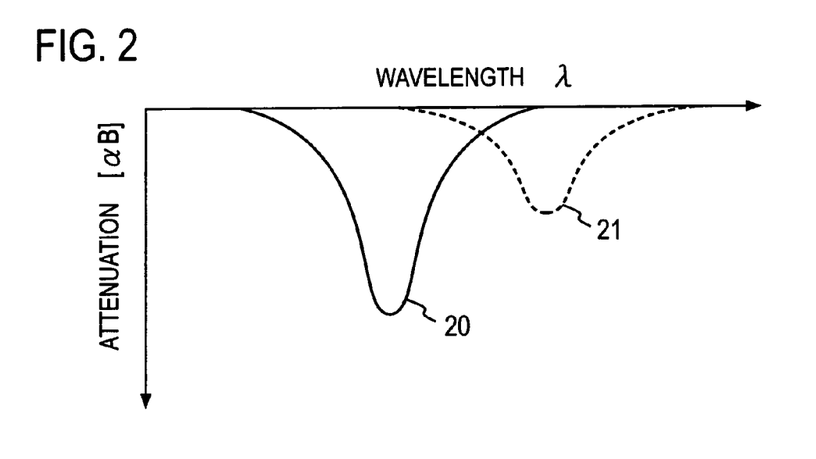
FIG. 2 shows the wavelength vs. optical attenuation characteristics obtained when the attenuation factor and attenuation wavelength are freely adjusted by a reflective optical attenuator element.

Mirror device 1 and the reflective layer 3 formed on the 0° polished end facet of optical fiber 4 together form a Fabry-Perot resonator. An optical signal can only pass through reflective layer 3 if it has a wavelength that matches the resonator length and phase criteria of this resonator—that is, its wavelength must be an integer multiple of (0.5 $\lambda/n$), where $\lambda$ is the wavelength and n is the refractive index of the medium. Since wavelengths that pass through reflective layer 3 become attenuated wavelengths (referred to as "attenuation wavelengths" below), the attenuation factor from port $p_1$ to port $p_3$ exhibits the shape shown by waveform 20 in FIG. 2. The shapes shown in FIG. 2 are referred to below as "attenuation waveforms".

If mirror device 1 is moved away from reflective layer 3 in the direction of the optical axis, the resonator wavelength of the Fabry-Perot resonator increases and the attenuation wavelength shifts to a longer wavelength. Conversely, if mirror device 1 is moved closer towards reflective layer 3 in the direction of the optical axis, the attenuation wavelength shifts to a shorter wavelength. When mirror device 1 is positioned where it is able to interact with as much as possible of the evanescent light emitted from the end of optical fiber 4, the resonant efficiency of the Fabry-Perot resonator is maximized, as is the attenuation factor of the attenuated light. If mirror device 1 is then moved in a direction perpendicular to the optical axis so that it interacts with a smaller amount of evanescent light, the resonant efficiency decreases and the attenuation factor also decreases. The attenuation waveform 21 in FIG. 2 represents a state where the resonator length of the Fabry-Perot resonator is longer and the resonant efficiency is lower than the state represented by attenuation waveform 20. Thus, by controlling the resonator length and resonant efficiency of the Fabry-Perot resonator formed by mirror device 1 and reflective layer 3 formed on the 0° polished end facet of optical fiber 4, it is possible to freely control the attenuation wavelength and attenuation factor of optical attenuator element 11.

In the variable-gain optical equalizer shown in FIG. 1B, a plurality of optical attenuator elements are connected in a cascade configuration. The number of elements differs according to the required specifications of the optical transmission equipment—as the number of optical attenuator elements 11 increases, it becomes possible to achieve gain equalization characteristics with higher precision. The wavelength spectrum of the optical signal branched off by optical coupler 15 is measured by a spectrum monitor 14 to obtain the wavelength characteristics of the output intensity from the optical amplification equipment (referred to as the "gain profile" below).

In order to level out the gain profile, CPU 13 first creates a gain equalization profile whose characteristics are complementary to those of the gain profile. Then, based on non-linear fitting, it separates the gain equalization profile into attenuation waveforms equal in number to the number of optical attenuator elements 11. Since the attenuation waveforms are each produced by a Fabry-Perot resonator, they can be assumed to have Lorentz waveforms whose half-width is determined by the reflectivity of mirror device 1 and reflective layer 3. CPU 13 also determines the attenuation wavelength and attenuation factor of each optical attenuator element from the attenuation waveform, and determines the displacement of mirror device 1 in the direction of the optical axis and the direction perpendicular to the optical axis. An optical attenuator element drive circuit 12 controls each optical attenuator element 11 based on these displacements. Note that Fourier expansion is another method that could be used to separate the gain equalization profiles.

Next, the operation of variable-gain optical amplifier 10 is described with reference to the example of optical amplification equipment with a two-stage configuration shown in FIG. 1B. In this example, variable-gain optical equalizer 10 is configured from the cascade connection of four optical attenuator elements 11. In FIG. 1B, one hundredth of the total light intensity of the optical signal that has passed through the optical amplification equipment is branched off towards spectrum monitor 14 by an optical coupler 15. The wavelength spectrum of the optical signal is measured by spectrum monitor 14, allowing the gain profile to be determined. CPU 13 produces a gain equalization profile whose characteristics are complementary to those of the gain profile, and based on non-linear fitting it separates the gain equalization profile into four Lorentz waveforms. The central wavelength (attenuation wavelength) and attenuation factor of each Lorentz waveform are respectively converted into displacements of mirror device 1 in the direction of the optical axis and in the direction perpendicular to the optical axis. An optical attenuator element drive circuit 12 controls the optical attenuator elements 11 based on these displacements.

Figure 3:
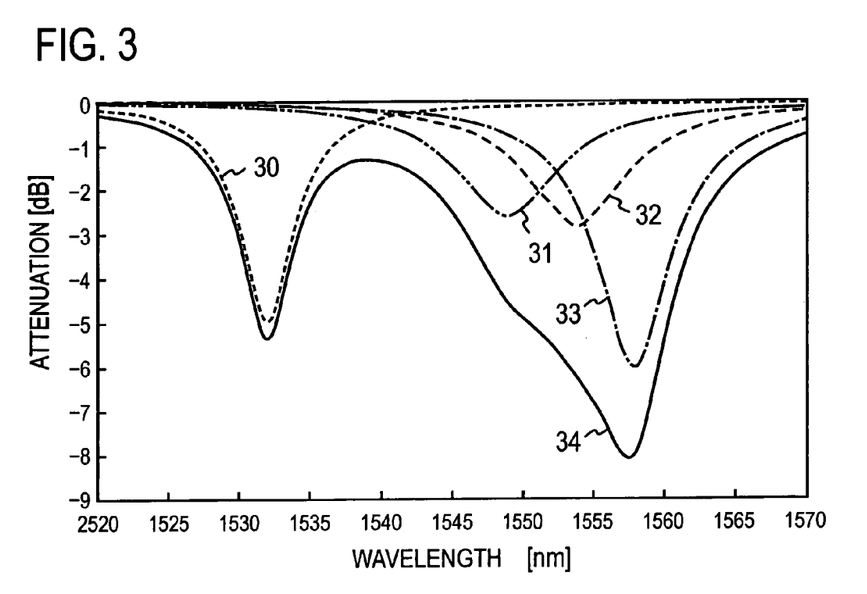
FIG. 3 shows the wavelength vs. optical attenuation characteristics obtained when the attenuation factor and the wavelength characteristics thereof are freely adjusted by four cascade-connected reflective optical attenuator elements.

An experimental example of the present invention is shown in FIG. 3. The attenuation waveforms produced by the individual optical attenuator elements 11 are indicated by waveforms 30-33 in FIG. 3, and the superposition of these four attenuation waveforms yields the gain equalization profile 34. In this example, the wavelength imbalance over the 1525-1565 nm wavelength band is less than ±0.25 dB, and the insertion loss of the variable-gain equalizer is only 4.5 dB. Although the gain equalization characteristics can be improved by increasing the number of optical attenuator elements 11 as mentioned above, every time another optical attenuator element is added, the insertion loss increased by about 1 dB. On the other hand, although the conventional example of a variable-gain optical equalizer shown in FIG. 11 has a wavelength imbalance of less than ±0.25 dB and a performance similar to that of the variable-gain optical equalizer of this invention, its insertion loss is at least 10 dB.

Figure 4:
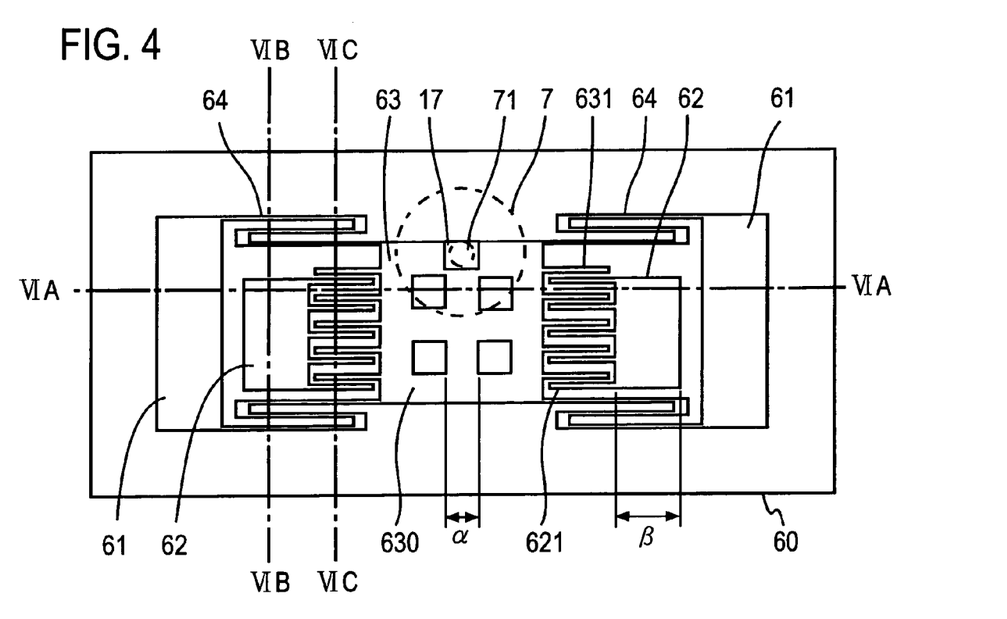
FIG. 4 shows a plan view of an embodiment of a MEMS optical attenuator device.
Figure 6A:
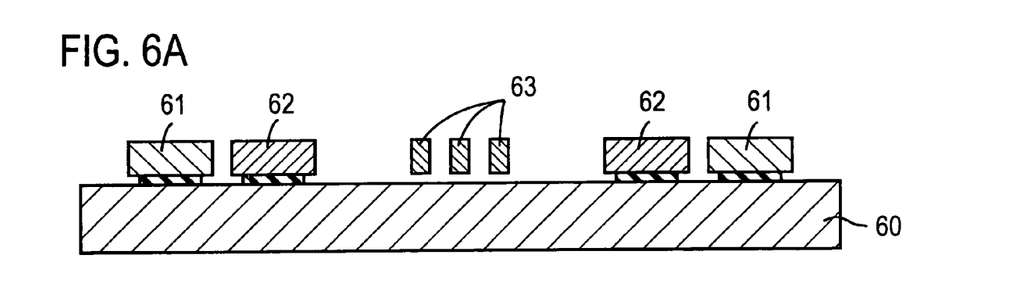
FIG. 6A shows a cross-sectional view of the MEMS optical attenuator device shown in FIG. 4 along line VIA.
Figure 6B:
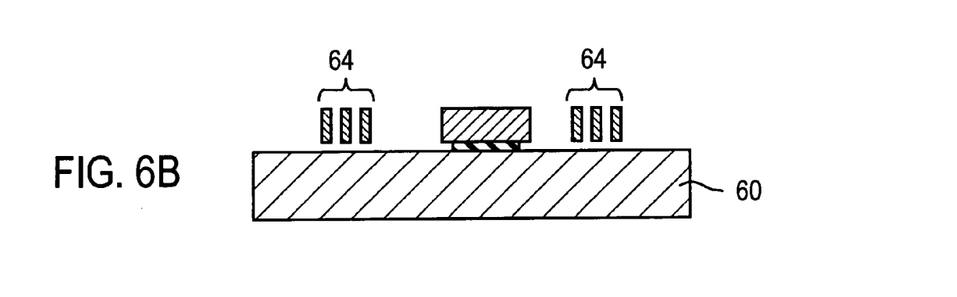
FIG. 6B shows a cross-sectional view of the MEMS optical attenuator device shown in FIG. 4 along line VIB.
Figure 6C:
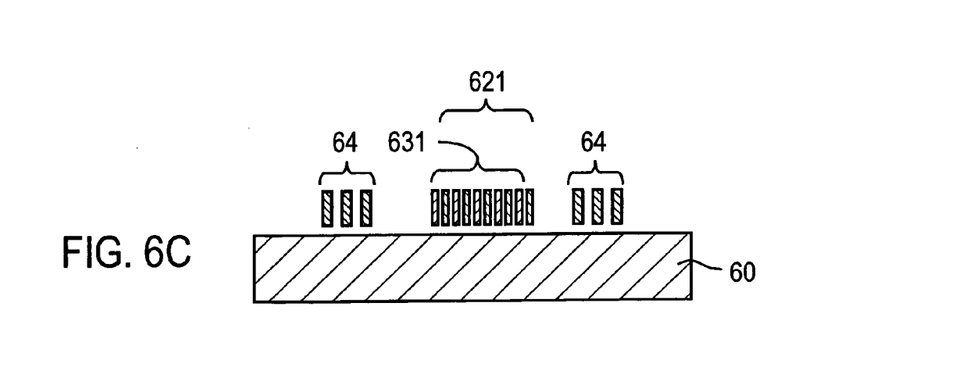
FIG. 6C shows a cross-sectional view of the MEMS optical attenuator device shown in FIG. 4 along line VIC.

The MEMS optical attenuator device is described with reference to FIGS. 4 and 6. This MEMS device uses an SOI substrate formed by sandwiching an insulating layer between a silicon substrate layer and an active layer. FIG. 4 shows a plan view of a MEMS device that constitutes the fully-reflective mirror of a Fabry-Perot resonator, including the mirror surface. This figure shows the shape as seen from the side of the mirror formed in the surface parallel with the substrate plate surface of the movable electrode plate provided in the active layer, and also depicts the projected position of the optical fiber core. The figures in FIG. 6 are all cross sections of the MEMS optical device shown in FIG. 4.

In FIG. 4, 60 is a silicon substrate. On this silicon substrate 60, anchors 61 are formed in an opposing configuration with an intervening oxide layer. Also, fixed electrodes 62 are formed on silicon substrate 60 in an opposing configuration with an intervening oxide layer inside the anchors 61 formed in an opposing configuration. Fixed electrode comb parts 621 are formed facing towards each other on the opposing fixed electrodes 62. 63 is a movable electrode that has a plate-shaped main body 630. This movable electrode main body 630 is kept freely suspended by connecting it to the two anchors 61 via two hinges 64 each. The four hinges 64 function as springs, whereby the movable electrode main body 630 is held at an initial position when no external force acts and is displaced away from the initial position according to externally applied forces. Also, movable electrode comb parts 631 are formed facing towards fixed electrode comb parts 621 of the two fixed electrodes 62 in the movable electrode main body 630 of movable electrode 63. The numbers of comb teeth provided in fixed electrode comb parts 621 and movable electrode comb parts 631 that face towards each other are either the same or differ by one, and the comb teeth of one are positioned between the comb teeth of the other without coming into contact with them. Here, each comb tooth is situated so as to lie closer to one of the comb teeth of the other comb part.

7 represents a single-mode optical fiber, and 71 represents the projected core position of optical fiber 7. The axis of this optical fiber 7 is perpendicular to the plane of the page, and the end facet of optical fiber 7 is fixed opposite movable electrode main body 630. A movable mirror 17 is provided on movable electrode main body 630 in the part facing towards core 71 of optical fiber 7. Movable mirror 17 can be formed by, for example, coating movable electrode main body 630 with a highly reflective material such as Au.

For example, in the position where no external forces act on movable electrode main body 630 (the initial position), movable mirror 17 is set so as to reflect the greatest amount of light from the core of optical fiber 7, resulting in the maximum resonant efficiency and the maximum attenuation factor. Here, if a voltage is applied between fixed electrode 62 and movable electrode 63, electrostatic attraction is generated between fixed electrode comb part 621 and movable electrode comb part 631. Since the electrostatic attraction acts more strongly where there is a narrower gap between the comb teeth, movable electrode main body 630 is displaced in the direction where this narrow gap becomes even narrower. Accordingly, movable mirror 17 is displaced up or down in the plane of the page according to the voltage. When movable mirror 17 is displaced up or down in the plane of the page to create an offset in the position of movable mirror 17 relative to the core 71 of optical fiber 7, the optical resonant efficiency changes according to the amount of displacement and the attenuation factor of the optical attenuator element changes.

Figure 5:
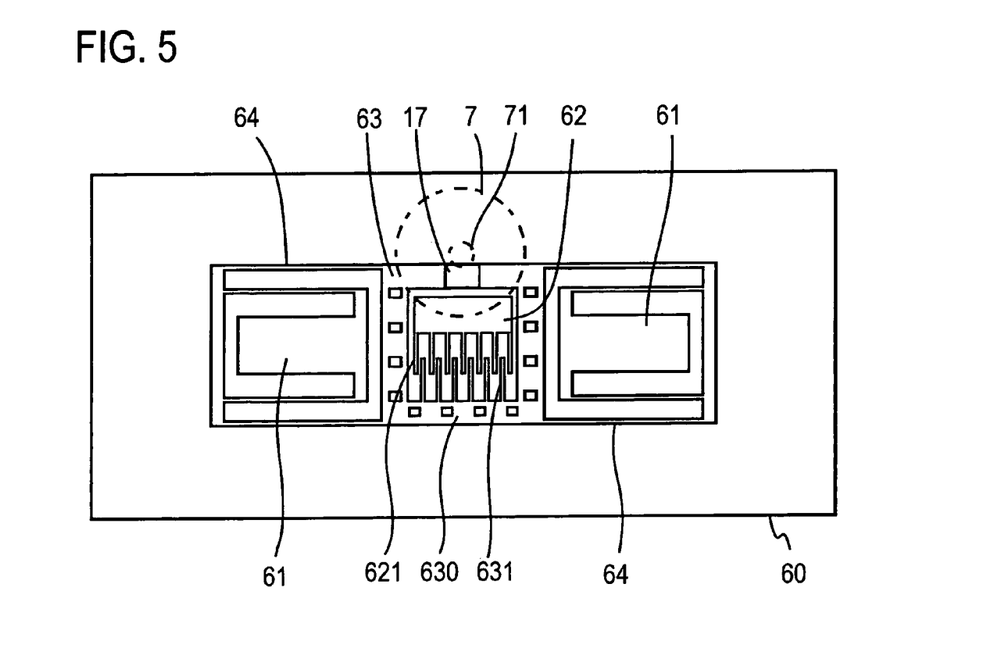
FIG. 5 shows a plan view of another embodiment of a MEMS optical attenuator device.

Another example of a MEMS optical attenuator device is described with reference to FIG. 5. In FIG. 5, constituent parts that also appear in FIG. 4 are labeled with the same reference numbers.

For example, in the position where no external forces act on movable electrode main body 630 (the initial position), movable mirror 17 is set so as to reflect the least amount of light from the core of optical fiber 7 (minimum resonant efficiency, minimum attenuation factor). If a voltage is applied between fixed electrode 62 and movable electrode 63, movable electrode comb part 631 of movable electrode 63 and fixed electrode comb part 621 of fixed electrode 62 are subjected to electrostatic attraction between the comb parts of the two electrodes, causing movable electrode 63 to be displaced in the direction of increased enmeshing between these comb parts. Accordingly, movable mirror 17 is displaced up or down in the plane of the page according to the voltage. When movable mirror 17 is displaced up or down in the plane of the page to create an offset in the position of movable mirror 17 relative to the core 71 of optical fiber 7, the optical resonant efficiency changes according to the amount of displacement and the attenuation factor of the optical attenuator element changes.

In FIGS. 4 and 5, the movable electrode 63 on which movable mirror 17 is formed is, for example, earthed to GND. Then, by applying a voltage to the underlying silicon substrate 61 which is insulated from fixed electrode 62 by an oxide layer, movable mirror 17 can be displaced in the direction perpendicular to the sheet surface of silicon substrate 6, thereby changing the resonator length—i.e., the attenuation wavelength.

Figure 7:
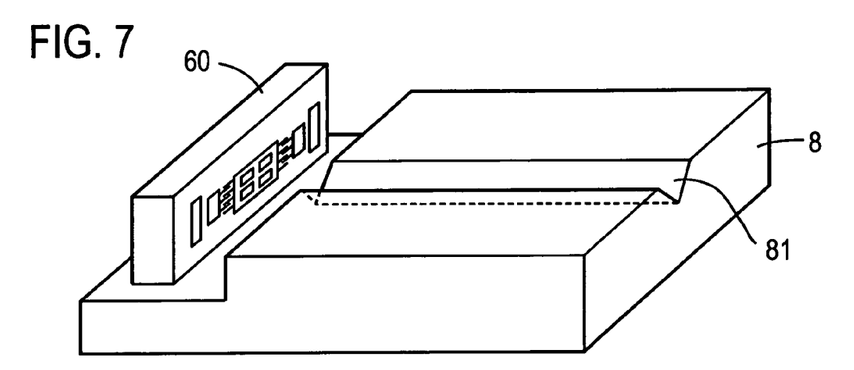
FIG. 7 shows a bird's eye view of an example of a base substrate on which a MEMS optical attenuator device is configured.
Figure 8:
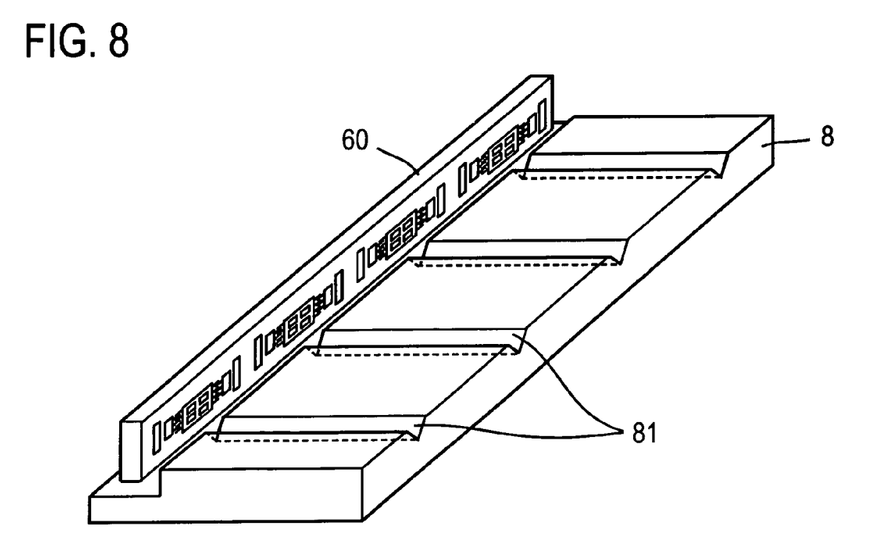
FIG. 8 shows a bird's eye view of an example of a base substrate on which four MEMS optical attenuator devices are integrated.

FIG. 7 illustrates the structure of base substrate 8 which configures a Fabry-Perot resonator by directing the end facet of optical fiber 7 towards a MEMS device as shown in FIGS. 4 and 5. Here, the optical fiber mounting groove 81 formed in base substrate 8 has a V-shaped cross section. For example, as a simple method for positioning the axial direction of an optical fiber, image recognition (using images obtained from above) could be employed to make the multi-layer film mirror formed at the end of the optical fiber like up with the edge of the step part at the end of the V-shaped groove. Also, as an example of a method for positioning the axis of the optical fiber in the perpendicular direction, the MEMS device could be positioned and fixed in place based on a marker provided at a prescribed position on the base substrate. In practice, since these MEMS devices and base substrates are configured from SOI and silicon wafers, they can easily be produced in arrays by forming and cutting off individual series of Fabry-Perot resonators sufficient in number for variable-gain optical equalizers according to this invention, which is advantageous for making the devices more compact and increasing their integration density. FIG. 8 shows an example of a base substrate used in an array configuration.

Figure 9A:
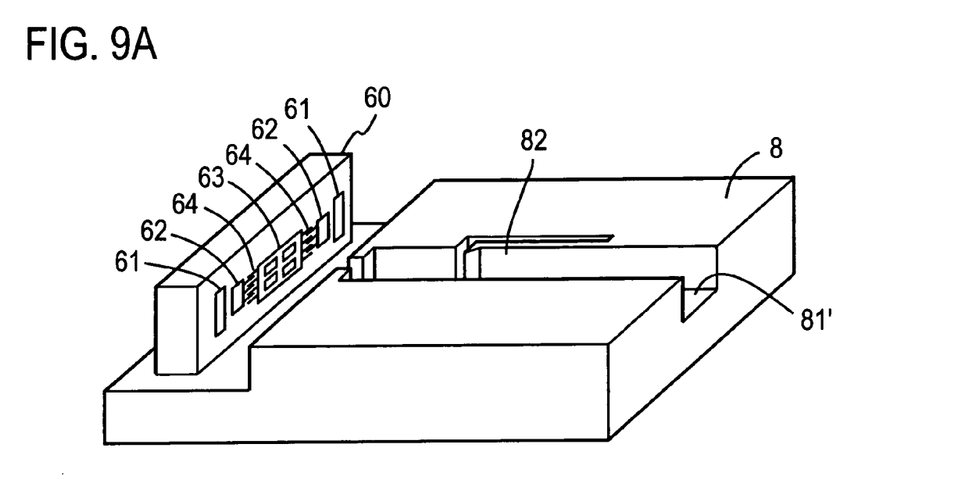
FIG. 9A shows a bird's eye view of another example of a base substrate on which a MEMS optical attenuator device is configured.
Figure 9B:
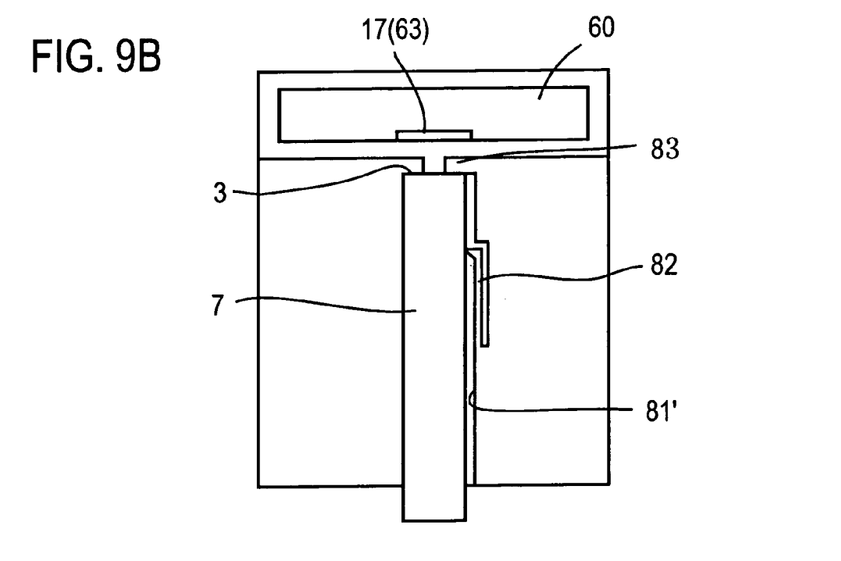
FIG. 9B shows a plan view of another example of a base substrate on which a MEMS optical attenuator device is configured.

FIG. 9 illustrates another example of the configuration of the base substrate. This base substrate 8 is provided with a groove 81' having a rectangular cross-section instead of a groove with a V-shaped cross-section. This is formed in the SOI substrate by a process such as anisotropic etching by deep-RIE (reactive ion etching). An advantage of this approach is that it makes it possible to simultaneously form an optical fiber end facet abutment part 83 and a clamp spring 82 that keeps the optical fiber axis secured in a lateral orientation—the abutment part 83 is particularly advantageous because it eliminates the need for image recognition processing from above in order to position the optical fiber in the axial direction.

FIG. 10 illustrates various steps in the production of a MEMS device according to this invention.

Figure 10A:
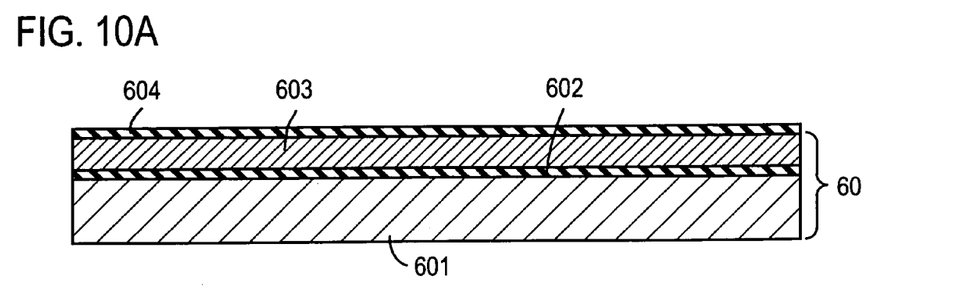
FIG. 10A shows a cross-sectional view of a step in the production of a MEMS device where an oxide film masking layer is formed on the upper surface of the silicon active layer of an SOI wafer consisting of a silicon oxide insulating layer sandwiched between a silicon substrate layer and a silicon active layer.

(Step 1) An SOI wafer 60 is prepared with a silicon oxide insulating layer 602 sandwiched between a silicon substrate layer 601 and a silicon active layer 603, and an oxide film masking layer 604 is formed on the upper silicon active layer 603 which is a monocrystalline silicon layer (FIG. 10A).

Figure 10B:
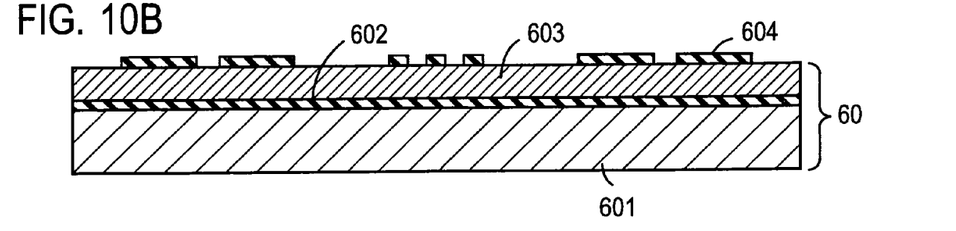
FIG. 10B shows a cross-sectional view of a step in the production of a MEMS device where a pattern is formed by photolithography in the oxide film masking layer.

(Step 2) Photolithography is used to form a pattern in oxide film masking layer 604 (FIG. 10B).

Figure 10C:
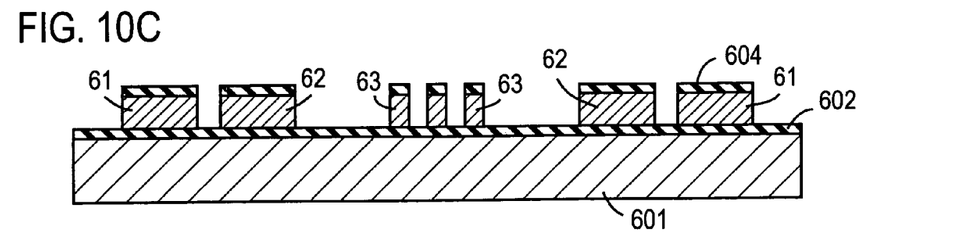
FIG. 10C shows a cross-sectional view of a step in the production of a MEMS device where the silicon active layer is subjected to anisotropic etching in a perpendicular direction by a dry etching technique using the patterned oxide film masking layer as a mask.

(Step 3) With the patterned oxide film masking layer acting as a mask, a dry etching technique such as deep-RIE is used to perform anisotropic etching of silicon active layer 603 in a perpendicular direction (FIG. 10C).

Figure 10D:
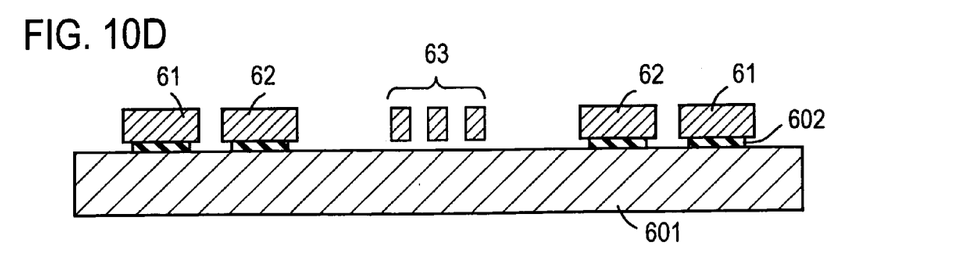
FIG. 10D shows a cross-sectional view of a step in the production of a MEMS device where the silicon oxide insulating layer 602 is removed by etching to leave the movable electrode body 630 freely suspended.

(Step 4) Silicon oxide insulating layer 602 is removed by etching to leave movable electrode main body 630 in a freely suspended state (FIG. 10D). A suitable etching time is set so that silicon oxide insulating layer 602 is removed from underneath the narrow sections of silicon active layer 603, thereby separating them from silicon substrate layer 601. Meanwhile the silicon oxide insulating layer 602 underneath the wider sections of silicon active layer 603 is partially removed around the edges but is otherwise left largely intact to form anchors 61 and fixed electrodes 62. Note that oxide film masking layer 604 is also etched away at the same time.

(Step 5) The surface of the resulting movable electrode main body 630 is coated with a highly reflective metal film of Au or the like to simultaneously form movable mirror 17 and electrode pads, thereby completing the production of the MEMS device.

In FIGS. 4 and 5, movable electrode main body 630 is illustrated with a number of square holes, the purpose of which is to make movable electrode main body 630 lighter and to result in movable electrode main body 630 being configured from narrow linear parts so that it becomes freely suspended at Step 4. For example, in FIG. 4, by setting widths of $\alpha$=20-30 µm and $\beta$>50 µm, it is possible to make one part movable while the other part remains fixed.

In FIGS. 4 and 5, the hinges drawn with very narrow lines are produced as thin flat spring shapes whose height is greater than their width, resulting in a large range of movement in the horizontal direction and a small range of movement in the direction perpendicular to the surface. Specifically, the horizontal displacement used to control the reflectance is determined according to the diameter of the optical fiber core and is set to, e.g., 10 µm or less. The displacement in the perpendicular direction used to control the resonator length is determined according to the range of attenuation wavelengths, and is set to, e.g., 10 nm or less.

Although an SOI substrate is used in the embodiment described above, there are two requirements that must be met by the substrate. The first relates to the material it is made from, which must consist of an insulating layer on an electrically conductive substrate with a layer of flexible electrically conductive material on top. The second relates to the fabrication of the MEMS device, in that the material must be suitable for anisotropic etching in a perpendicular direction by a technique such a dry etching. Any material that meets these requirements can be used to produce a MEMS device according to the present invention without restriction to SOI substrates.

What is claimed is:

1. A reflective optical attenuator element comprising:
    a Fabry-Perot resonator unit consisting of a dielectric multi-layer film formed on the 0° polished end facet of an optical fiber and a mirror that faces towards it, and
    a drive unit that displaces said mirror in the direction of the optical axis and in a direction perpendicular to the optical axis.

2. An optical attenuator element according to claim 1, wherein the drive unit comprises:
    a substrate that exhibits electrical conductivity,
    a movable electrode plate that is held with freedom to move both in a direction parallel with a surface of said substrate and in a direction perpendicular to this surface, and which has set into its surface the mirror of said Fabry-Perot resonator unit, which is electrically insulated from said substrate,
    a fixed electrode plate which is formed on and electrically insulated from said substrate,
    a perpendicular drive means which is formed between said substrate and movable electrode plate, and which uses electrostatic driving to move the movable electrode plate in said perpendicular direction, and
    a horizontal moving means which is formed between the fixed electrode plate and movable electrode plate, and which uses electrostatic driving to move the movable electrode plate in the parallel direction.

3. A variable-gain optical equalizer comprising:
    a plurality of optical attenuator elements, which are connected in cascade via an optical circulator, comprising:
        a Fabry-Perot resonator unit consisting of a dielectric multi-layer film formed on the 0° polished end facet of an optical fiber and a mirror that faces towards it, and
        a drive unit that displaces said mirror in the direction of the optical axis and in a direction perpendicular to the optical axis; and
    a control means that independently controls the drive units of said plurality of optical attenuators.

4. A variable-gain optical equalizer according to claim 3 comprising:
    a second substrate that positions the plurality of optical fibers and drive units of the said optical attenuator elements.

5. Optical amplification equipment comprising:
    a variable-gain optical equalizer comprising:
        a plurality of optical attenuator elements, which are connected in cascade via an optical circulator, comprising:
            a Fabry-Perot resonator unit consisting of a dielectric multi-layer film formed on the 0° polished end facet of an optical fiber and a mirror that faces towards it, and
            a drive unit that displaces said mirror in the direction of the optical axis and in a direction perpendicular to the optical axis: and
        a control means that independently controls the drive units of said plurality of optical attenuators,
    an optical amplifier connected to the optical signal input side and/or output side of the said variable-gain optical equalizer,
    an optical coupler which is connected after the variable-gain optical equalizer and optical amplifier and branches off part of the optical signal,
    a monitor unit that receives the light branched off from the optical coupler and measures the light intensity at a plurality of wavelengths,
    and a processing unit that receives the output of the monitor unit and determines and outputs control signals to the control unit of said variable-gain optical equalizer.

6. Optical amplification equipment as claimed in claim 5, comprising:
    a second substrate that positions the plurality of optical fibers and drive units of the said optical attenuator elements.

7. An array substrate comprising:
    a plurality of optical attenuator element drive units comprising:
        a Fabry-Perot resonator unit consisting of a dielectric multi-layer film formed on the 0° polished end facet of an optical fiber and a mirror that faces towards it, and
        a drive unit that displaces said mirror in the direction of the optical axis and in a direction perpendicular to the optical axis; and
    a second substrate comprising a plurality of channels that position the plurality of optical fibers of the said optical attenuator elements.

8. A variable-gain optical equalizer according to claim 3, wherein the drive unit comprises:
    a substrate that exhibits electrical conductivity,
    a movable electrode plate that is held with freedom to move both in a direction parallel with a surface of said substrate and in a direction perpendicular to this surface, and which has set into its surface the mirror of said Fabry-Perot resonator unit, which is electrically insulated from said substrate, a fixed electrode plate which is formed on and electrically insulated from said substrate, a perpendicular drive means which is formed between said substrate and movable electrode plate, and which uses electrostatic driving to move the movable electrode plate in said perpendicular direction, and a horizontal moving means which is formed between the fixed electrode plate and movable electrode plate, and which uses electrostatic driving to move the movable electrode plate in the parallel direction.

9. A variable-gain optical equalizer according to claim 8 comprising:

a second substrate that positions the plurality of optical fibers and drive units of the optical attenuator elements.

10. Optical amplification equipment according to claim 5, wherein the drive unit comprises:

a substrate that exhibits electrical conductivity, a movable electrode plate that is held with freedom to move both in a direction parallel with a surface of said substrate and in a direction perpendicular to this surface, and which has set into its surface the mirror of said Fabry-Perot resonator unit, which is electrically insulated from said substrate, a fixed electrode plate which is formed on and electrically insulated from said substrate, a perpendicular drive means which is formed between said substrate and movable electrode plate, and which uses electrostatic driving to move the movable electrode plate in said perpendicular direction, and a horizontal moving means which is formed between the fixed electrode plate and movable electrode plate, and which uses electrostatic driving to move the movable electrode plate in the parallel direction.

11. Optical amplification equipment according to claim 10 comprising:

a second substrate that positions the plurality of optical fibers and drive units of the optical attenuator elements.

12. An array substrate according to claim 7, wherein the drive unit comprises:

a substrate that exhibits electrical conductivity, a movable electrode plate that is held with freedom to move both in a direction parallel with a surface of said substrate and in a direction perpendicular to this surface, and which has set into its surface the mirror of said Fabry-Perot resonator unit, which is electrically insulated from said substrate, a fixed electrode plate which is formed on and electrically insulated from said substrate, a perpendicular drive means which is formed between said substrate and movable electrode plate, and which uses electrostatic driving to move the movable electrode plate in said perpendicular direction, and a horizontal moving means which is formed between the fixed electrode plate and movable electrode plate, and which uses electrostatic driving to move the movable electrode plate in the parallel direction.

* * * * *